(12) United States Patent
Utsumi

(10) Patent No.: US 9,174,419 B2
(45) Date of Patent: Nov. 3, 2015

(54) QUAKE-RESISTANT PLYWOOD LAMINATE

(71) Applicant: Teiji Utsumi, Iwanuma (JP)

(72) Inventor: Teiji Utsumi, Iwanuma (JP)

(*) Notice: Subject to any disclaimer, the term of this patent is extended or adjusted under 35 U.S.C. 154(b) by 86 days.

(21) Appl. No.: 13/863,928

(22) Filed: Apr. 16, 2013

(65) Prior Publication Data

US 2013/0316124 A1 Nov. 28, 2013

(30) Foreign Application Priority Data

May 28, 2012 (JP) ............................. 2012-003159 U

(51) Int. Cl.
| | |
|---|---|
| *B32B 21/13* | (2006.01) |
| *B32B 7/00* | (2006.01) |
| *B32B 7/12* | (2006.01) |
| *B32B 21/14* | (2006.01) |
| *B32B 3/14* | (2006.01) |
| *B32B 3/18* | (2006.01) |
| *E04B 1/10* | (2006.01) |

(52) U.S. Cl.
CPC . *B32B 21/13* (2013.01); *B32B 3/14* (2013.01); *B32B 3/18* (2013.01); *B32B 7/005* (2013.01); *B32B 7/12* (2013.01); *B32B 21/14* (2013.01); *E04B 1/10* (2013.01); *B32B 2250/05* (2013.01); *B32B 2250/40* (2013.01); *B32B 2255/00* (2013.01); *B32B 2255/08* (2013.01); *B32B 2307/54* (2013.01); *B32B 2307/542* (2013.01); *B32B 2307/544* (2013.01); *B32B 2307/546* (2013.01); *B32B 2307/558* (2013.01); *B32B 2307/734* (2013.01); *B32B 2419/00* (2013.01); *B32B 2419/04* (2013.01); *B32B 2607/00* (2013.01); *Y10T 428/24066* (2015.01)

(58) Field of Classification Search
CPC ........................................................ B32B 21/13
USPC ............................................... 428/50, 58, 106
See application file for complete search history.

(56) References Cited

FOREIGN PATENT DOCUMENTS

| | | |
|---|---|---|
| JP | 49-034270 U | 3/1974 |
| JP | 11-077609 A | 3/1999 |
| JP | 3176997 U | 7/2012 |
| JP | 3177561 U | 8/2012 |

*Primary Examiner* — Alexander Thomas
(74) *Attorney, Agent, or Firm* — Westerman, Hattori, Daniels & Adrian, LLP

(57) ABSTRACT

A plywood laminate includes: a plate having lateral wood grains as a core plate material; additional core plate materials that sandwich the core plate material from both sides, wood grains of one of the additional core plate materials being 45° inclined and wood grains of the other one thereof being 45° inclined in an opposite direction; and, a front plate material and a rear plate material having vertical wood grains and superposed on the outside of the additional core plate materials, wherein plates constituting the plywood laminate are formed by assembling cut pieces obtained by cutting along cutting lines obtained by assembling isosceles right triangles without gap or by cutting along cutting lines obtained by assembling a pentagon of which upper portion is an isosceles right triangle and an isosceles.

2 Claims, 6 Drawing Sheets

11

5(6)

12

2

13

3(4)

QUAKE-RESISTANT PLYWOOD LAMINATE

DETAILED DESCRIPTION OF THE INVENTION

1. Technical Field

The invention relates to a quake-resistant plywood laminate of which rigidity against a load from vertical, lateral and inclined directions is improved.

2. Background Art

A general plywood laminate, for example, a 5 plywood laminate has been obtained by sticking plates one by one so that a fiber direction thereof may be orthogonal with each other, and has been used as an MP construction material such as an attic material and an interior and exterior wall material, a underfloor material, and a floor material.

However, upon checking wall materials and so on of wooden buildings destroyed owing to earth quake and so on, buildings and walls are broken by obliquely twisting. That is, because of a load applied in an inclined direction owing to lateral oscillation or gravity, buildings are partially or totally destroyed to result in a huge damage.

On the other hand, in order to improve rigidity by combining not only veneers having vertical and lateral fiber directions but also veneers having an inclined fiber direction, in a plywood laminate where a fiber bundle material of, for example, JP 49-34270 Y is used as an inclined core, a structure where in a front veneer, a vertical core and a rear veneer, a veneer the same as that of the conventional veneer where fiber directions thereof are orthogonal with each other is used, a veneer having 45° inclined fiber direction as an additional core is used as an inclined core, and a plywood laminate is constituted so that fiber directions of the respective veneers constituting a plywood laminate are sequentially inclined by 45°, or a structure where in place of an inclined core of a veneer, many fiber bundle materials coated with an adhesive are arranged in parallel and stacked flat so that a fiber direction may be 45° inclination is used is disclosed.

Further, in an all direction strengthened plywood laminate according to JP 11-77609 A, a structure where veneers each of which has vertical wood grains, lateral wood grains, leftwardly 45° inclined wood grains or rightwardly 45° inclined wood grains are joined is disclosed.

However, according to the above structures, a sufficient effect could not be laconically obtained with a simple structure.

PRIOR ART

Patent Document

[Patent Document 1] JP 49-34270 Y
[Patent Document 2] JP 11-77609 A

SUMMARY OF THE INVENTION

Problems that the Invention is to Solve

The problem that the present invention is to solve is to provide a plywood laminate that has a strength even when a load is applied from an inclined direction to a plywood laminate used as a construction material and so on. For this purpose, by processing a generally used veneer having vertical wood grains and by pinching and machining when processing a plywood laminate, it is realized to strengthen quake-resistance from all directions. In particular, in a plate material that becomes an intermediate layer and has inclined wood grains, a square plate material having vertical or lateral wood grains is divided and the split pieces are stuck and used to provide a quake-resistant plywood laminate.

Another problem of the present invention is provide a quake-resistant plywood laminate having a structure where an entirety or a part of the respective plate materials constituting a plywood laminate is formed by sticking a plurality of plate materials having the same wood grains according to required strength.

Means for Solving the Problem

A quake-resistant plywood laminate of the present invention includes: a core plate material that is disposed at a center of a cuboid plywood laminate and has lateral wood grains; one additional core plate material that is stuck to one side of the core plate material and has 45° inclined wood grains; the other additional core plate material that is stuck to the other side of the core plate material and has 45° inclined wood grains in an opposite direction from that of the one additional core plate material; and exterior surface plates each of which is stuck to each of exterior surfaces of the one and the other additional core plate materials to be a front and a back and that have vertical wood grains; wherein the one and/or the other additional core plate material is configured of a rectangular plate material having 45° inclined wood grains, which is obtained in such a manner that a square plate material having vertical or lateral wood grains is divided into two equal parts along one diagonal to obtain a pair of first constituent pieces configured of isosceles right triangles, one of the first constituent pieces is divided into two equal parts along a bisector of an apex angle thereof to obtain a pair of second constituent pieces configured of isosceles right triangles, and, along respective hypotenuses of the first constituent piece, bases of the second constituent pieces are integrally joined by arranging wood grains along the respective hypotenuses of the first constituent piece.

An entirety or a part of the core plate material, one additional core plate material, the other additional core plate material and an exterior surface plate to be a front surface or a back surface of the quake-resistant plywood laminate may be formed by sticking a plurality of plates having arranged wood grains so as to have a predetermined strength.

Further, when the additional core plate material is formed by sticking a plurality of plate materials of which wood grains are arranged, between plate materials to be stuck, joint lines between a first constituent piece and a second, third constituent piece are preferably disposed not to be superposed.

Effect of the Invention

When as one additional core material of a plywood laminate, a plate material having 45° inclined wood grains is used, and as the other additional core material thereof, a plate material having 45° inclined wood grains in an opposite direction is used, a plywood laminate that has a strength even when a load is applied to a plywood laminate used as a construction material from all directions owing to earthquake and the like is realized.

An additional core material having 45° inclined wood grains can be readily formed by dividing a square plate material having vertical or lateral wood grains into isosceles right triangles and by sticking these with wood grains arranged. An additional core material obtained by sticking like this is stuck through a plane in a state sandwiched between a core plate material and an exterior surface plate; accordingly, even it is obtained by sticking divided pieces, the strength is not deteriorated.

Further, a core plate material, an additional core plate material, and an exterior surface plate may be formed by sticking, in accordance with use, a plurality of plate materials having the same wood grains. Thereby, necessary strength can be realized.

As a result thereof, the plywood laminate is excellent in strength (compression, tensile, bending) in all directions, free from warpage and dimensional deviation, excellent in quake resistance and long in durability, can effectively use wood resource and can readily realize to strengthen quake resistance from all directions at a low cost.

MODE FOR CARRYING OUT THE INVENTION

Hereinafter, preferable examples of quake resistant plywood laminates of the present invention will be described with reference to the drawings.

EXAMPLE 1

Figure 1:
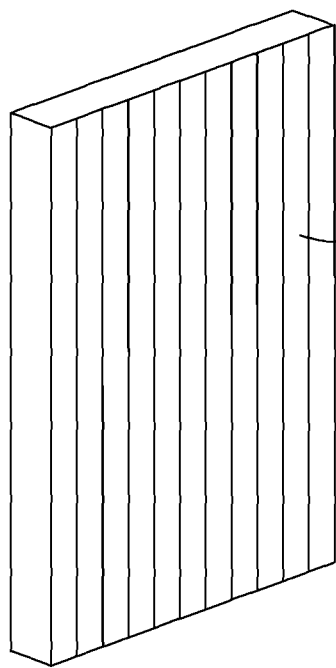
FIG. 1(a)-FIG. 1(d) show shows perspective views showing wood grains of the respective plate materials configuring a quake resistant plywood laminate and includes (a) a front plate material or a rear plate material having vertical wood grains, (b) a core plate material having lateral wood grains, (c) one additional core plate material having 45° inclined wood grains, and (d) the other additional core plate material having 45° inclined wood grains in an opposite direction.
Figure 1:
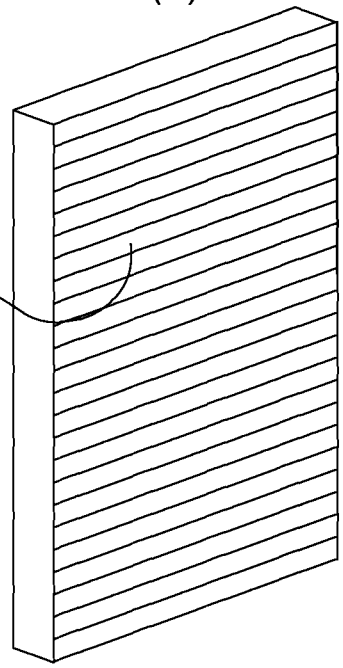
Figure 1:
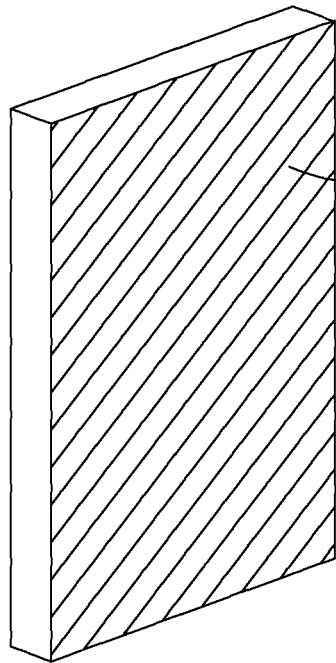
Figure 1:
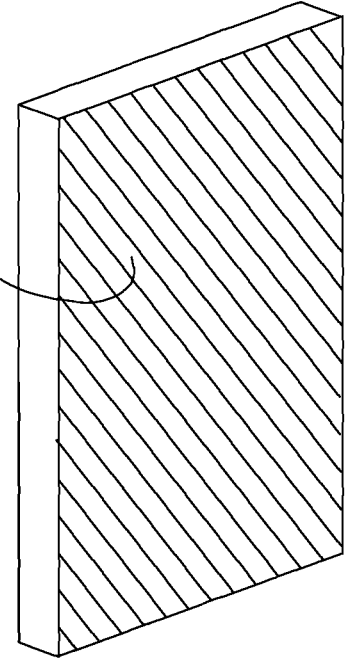
Figure 2:
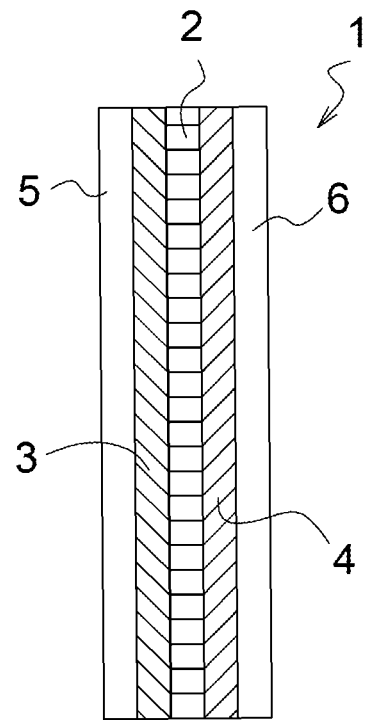
FIG. 2 is a side view schematically showing wood grains of a quake resistant plywood laminate.
Figure 3:
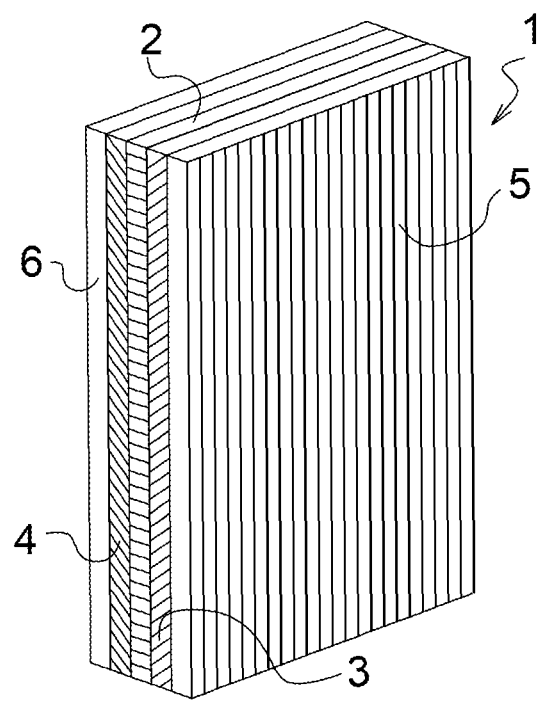
FIG. 3 is a perspective view schematically showing wood grains of a quake resistant plywood laminate.

A quake resistant plywood laminate 1 of the present example is configured of a plywood laminate obtained, as shown in FIGS. 1 to 3, by stacking an odd number of 900 mm (lateral)×1800 mm (vertical) plate materials, 5 plates in the example, and by sticking.

As a core plate material 2 that is a center, a veneer having lateral wood grains and a thickness of, for example, 1 mm to 5 mm is used (see FIG. 1 (b)).

A pair of plate materials each having 45° inclined wood grains of which inclination direction is opposite (orthogonal) from each other (see FIG. 1 (c), (d)) are prepared as additional core materials 3, 4, and are stuck so as to sandwich the core material 2.

As a material of plywood laminate of the invention, conifers such as Japanese cedar, pine, Japanese cypress, Thuga, *Thujopsis dolabrata* and so on; broad-leaf trees such as zelkova, oak, beech, *Quercus crispula*, Japanese cherry, paulownia, lauan, teak and so on; and combinations thereof can be cited. However, in the invention, as long as the material has a definite strength, the kind thereof is not particularly limited, and, obtained plywood laminates can be appropriately selected and used according to use and appearance thereof.

When joining the respective plates configuring a plywood laminate with each other, and assembling one constituent plate described below by gathering, a known adhesive is used. The kind thereof is selected according to features of the respective adhesives and uses of plywood laminates.

That is, as kinds of adhesives, for example, emulsion-based adhesives such as rubber-based, ethylene-vinyl acetate copolymer-based, acryl resin-based and so on; solvent-based adhesives such as rubber-based, polyvinyl chloride-based, polyvinyl acetate-based, acryl resin-based, polyurethane-based and so on; hot melt based adhesives such as ethylene-vinyl acetate copolymer-based, styrene-butadiene-block copolymer-based, styrene-isobutylene block copolymer-based, polyester-based, polyamide-based and so on; thermosetting adhesives such as phenol resin-based, melamine resin-based, urea resin-based, epoxy resin-based and so on can be cited. However, without limiting to these, known adhesives can be used.

Further, when the respective constituent plates coated with an adhesive are joined, a press machine, a pressure roll or the like is used. However, in the case where a hot melt base adhesive or a thermosetting adhesive is used, after tentatively joining at room temperature for several minutes to several hours to remove warpage, the respective constituent plates are joined under heating. By heating with steam, a heater or other known method, the respective constituent plates can be integrally joined.

Then, two veneers having vertical wood grains (see FIG. 1 (a)) are prepared as a front plate material 5 and a rear plate material 6, and are stuck so as to sandwich the additional core materials 3, 4 respectively on the outside thereof.

Thereby, as shown in FIGS. 2 and 3, a plywood laminate in which a front plate material 5, one additional core plate material 3, a core plate material 2, the other additional core plate material 4, and a rear plate material 6 are sequentially stacked and stuck is formed.

In the plywood laminate 1, wood grains are arranged in an order of vertical, downwardly 45° inclined, lateral, upwardly 45° inclined and vertical; accordingly, the plywood laminate 1 can improve sufficient strength against a load in all directions of vertical, lateral and inclined.

When the respective plate materials 2 to 6 are formed by sticking one or a plurality of plate materials having the same wood grains, strength of the respective plates and strength as a plywood laminate can be set to a desired strength.

Figure 4:
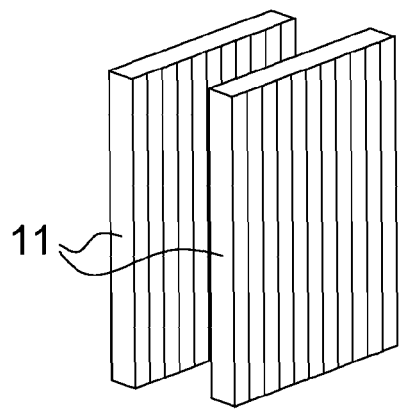
FIG. 4(a) is an exploded perspective view showing a state where a plurality of plate materials having vertical wood grains is superposed.
FIG. 4(b) is a side view of a front and rear plate material obtained by joining plate materials of FIG. 4(a)
Figure 4:
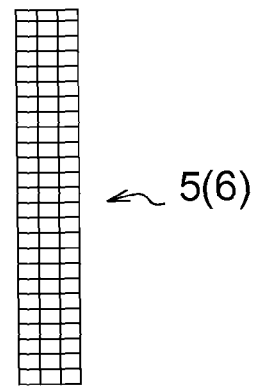

That is, FIG. 4 shows an example where a plurality of plate materials 11 (2 plates in illustrated example) having vertical wood grains is stuck to form one front plate material 5 or a rear plate material 6.

Figure 5:
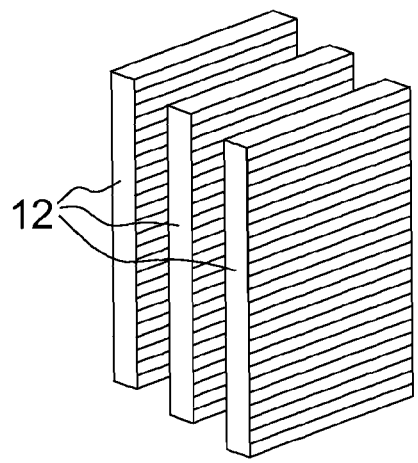
FIG. 5(a) is an exploded perspective view showing a state where a plurality of plate materials having lateral wood grains is superposed.
FIG. 5(b) is a side view of a core plate material obtained by joining plate materials of FIG. 5(a)
Figure 5:
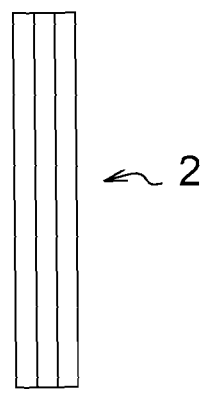

FIG. 5 shows an example where a plurality of plate materials 12 (3 plates in illustrated example) having lateral wood grains is stuck to form one core plate material 2.

Figure 6:
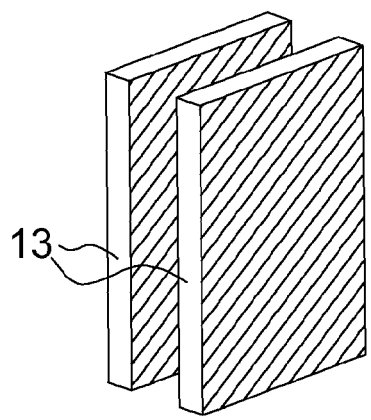
FIG. 6(a) is an exploded perspective view showing a state where a plurality of plate materials having inclined wood grains is superposed.
FIG. 6(b) is a side view of an additional core plate material obtained by joining plate materials of FIG. 6(a)
Figure 6:
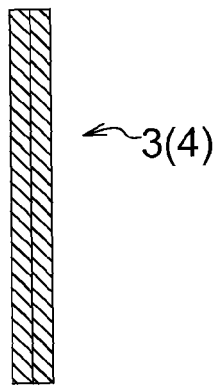

FIG. 6 shows an example where a plurality of plate materials 13 (2 plates in illustrated example) having 45° inclined wood grains is stuck to form one additional core plate material 3 or 4.

Like this, the number of the respective plate materials 2 to 6 to be stuck may be the same or different and may be optionally stuck and used according to conditions such as use and materials.

Next, in additional core plate materials 3, 4 having inclined wood grains, wood grains are necessary to incline by 45°. These additional core materials 3, 4 can be readily formed by cutting a plate material having vertical or lateral wood grains and by sticking these.

Each of the plate materials of the present example has a length of, for example, short side a (900 mm)×long side 2a×=b (1800 mm).

Figure 7:
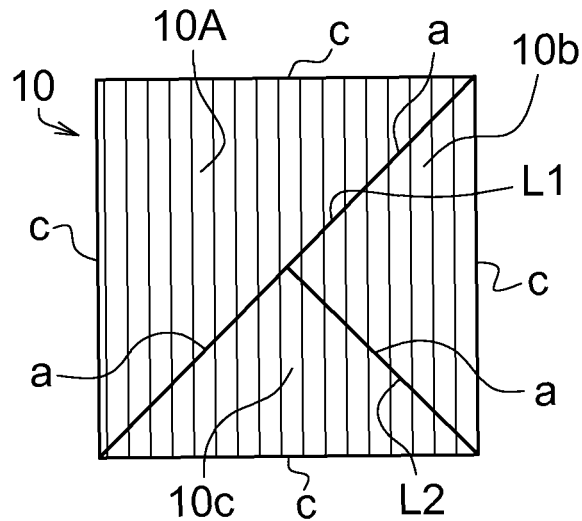
FIG. 7(a) is a front view showing cutting positions of a veneer having vertical wood grains.
FIG. 7(b) is a front view showing a combination of separated three pieces.
FIG. 7(c) is a front view of an additional core plate material obtained by joining three pieces.
Figure 7:
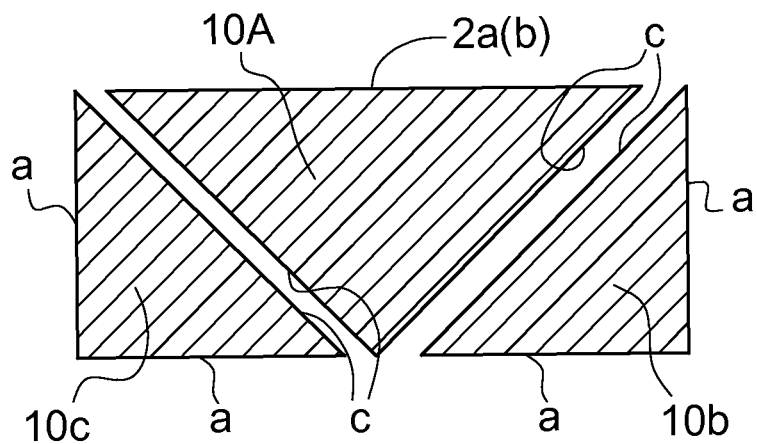
Figure 7:
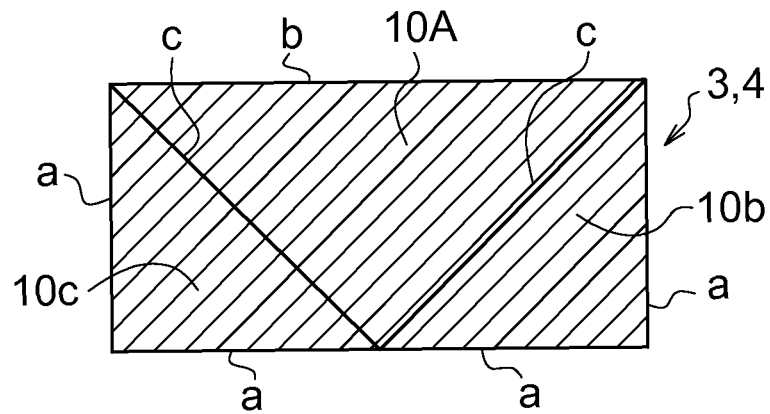
Figure 8:
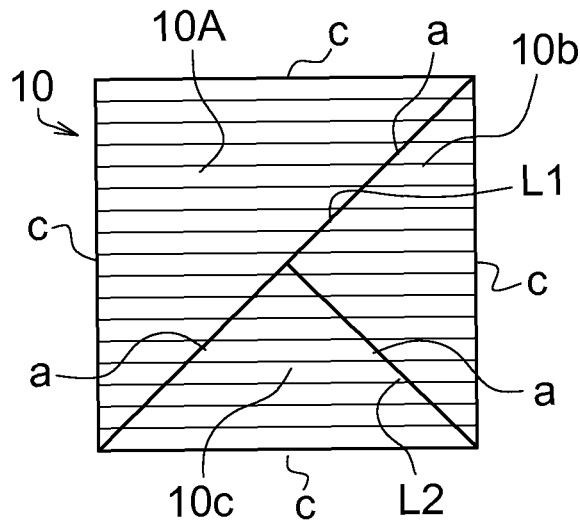
FIG. 8(a) is a front view showing cutting positions of a veneer having lateral wood grains.
FIG. 8(b) is a front view showing a combination of separated three pieces.
FIG. 8(c) is a front view of an additional core plate material obtained by joining three pieces.
Figure 8:
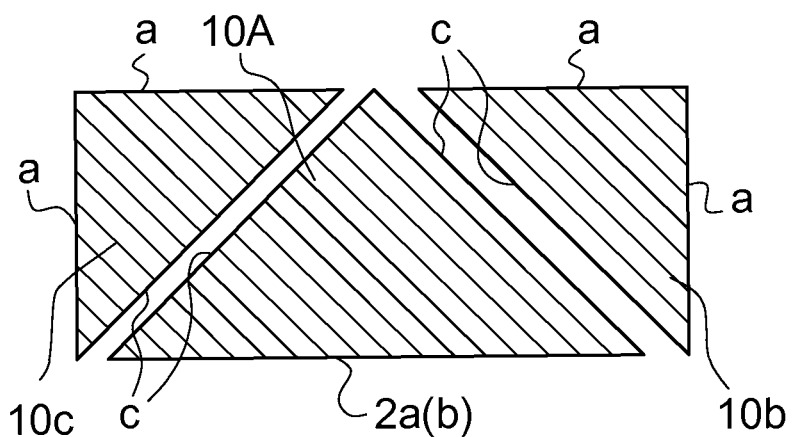
Figure 8:
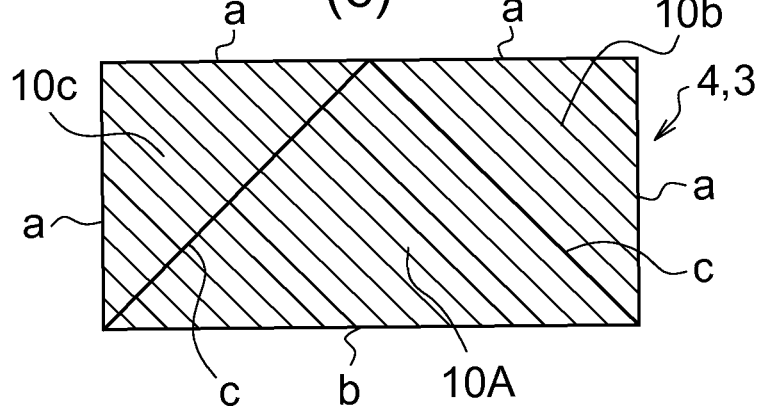

In FIGS. 7 and 8, a base length of an isosceles right triangle having a hypotenuse length of a is set to c (a√2) and a base length of an isosceles right triangle having a hypotenuse length of c is set to 2a (=b).

Here, a veneer 10 for forming additional core materials 3, 4 is configured of a square plate having vertical wood grains and a side length of a (see FIG. 7 (a)).

In the veneer 10, since a diagonal line L1 has a length of 2a (b), apart divided into two equal parts along the diagonal line L1 is a first split piece 10A of two isosceles right triangles having a hypotenuse c and a base 2a.

This isosceles right triangle has wood grains in parallel with one hypotenuse.

By dividing one first split piece 10A into two equal parts along a bisector (the same as that of a vertical bisector of a base) of an apex angle, two equal parts configured of a second split piece 10b and a second split piece 10c each of which is an isosceles right triangle having a base length of c and a hypotenuse length of a are obtained.

The second split piece 10b has wood grains in parallel with a base, and a third split piece 10c has wood grains orthogonal with respect to a base.

Then, as illustrated in FIG. 7 (b), with the first split piece 10A disposed so that the base thereof is a longer side of a rectangle and an apex is a center point of an opposite longer side, and with the second split piece 10b and third split piece 10c combined so that apexes thereof form corner portions of a rectangle and bases thereof match with hypotenuses of the first split piece 10A, the three split pieces are disposed so that the respective wood grains thereof may continue and joint surfaces of the three split pieces are joined, thereby an additional core material having 45° inclined wood grains can be formed (see FIG. 7 (c)).

Here, a direction where wood grains incline can be reversed by turning a plate material over.

FIG. 8 illustrates a case where a veneer 10 having lateral wood grains is used.

A veneer 10 may be used by turning a plate material having vertical wood grains by 90°.

Also in this case, in a manner the same as that of the FIG. 7, a veneer is a square plate with a side length of c (see FIG. 8 (a)).

Two equal parts divided along a diagonal line L1 are first split pieces 10A configured of two isosceles right triangles having a hypotenuse c and a base 2a and wood grains thereof are in parallel with that of one hypotenuse.

One first split piece 10A is, when divided into two equal parts along a bisector (the same as that of a vertical bisector of a base) of an apex, divided into two equal parts of a second split piece 10b and a second split piece 10c configured of two isosceles right triangles having a base length of c and a hypotenuse length of a.

The second split piece 10b has wood grains running in parallel with a base, and the third split piece 10c has wood grains orthogonal to a base.

Then, as illustrated in FIG. 8 (b), with the first split piece 10A disposed so that the base thereof is a longer side of a rectangle and an apex is a center point of an opposite longer side, and with the second split piece 10b and third split piece 10c combined so that apexes thereof form corner portions of a rectangle and bases match with hypotenuses of the first split piece 10A, three split pieces are disposed so that the respective wood grains may continue and joint surface of the three split pieces are joined, thereby an additional core material having 45° inclined wood grains can be formed (see FIG. 8 (c)).

Also in this case, a direction where wood grains incline can be reversed by turning a plate material over.

Like this, when a square plate material 10 is divided into one first split piece 10A and two second split pieces 10b, 10c and these are combined and stuck, a rectangular additional core material 3 (or 4) can be formed.

Figure 9:
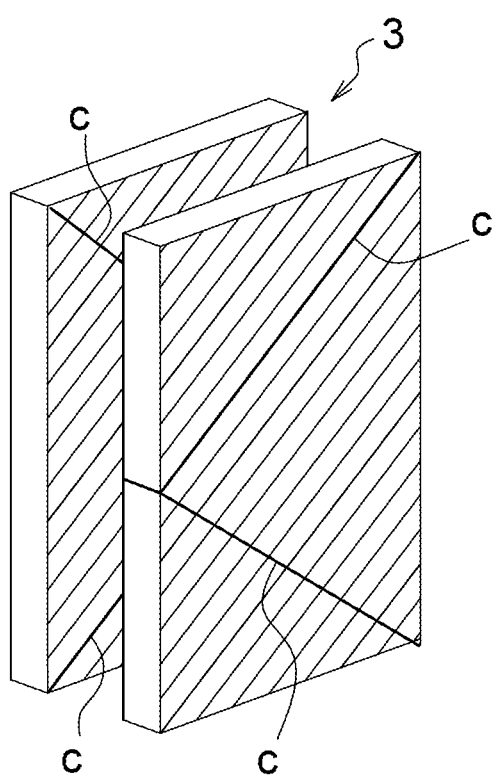
FIG. 9 is an exploded perspective view when a plurality of plate materials is stuck so that joint lines may not coincide.

When a plurality of the additional core plate materials is stacked to form one additional core plate material, as shown in FIG. 9, for example, these are preferably stuck so that joint lines of three pieces may not coincide with each other.

The invention is not limited to the above-described examples and can be variously modified in a range that does not alter the argument of the invention.

EXPLANATION OF REFERENCE MARKS

1: QUAKE-RESISTANT PLYWOOD LAMINATE
2: CORE PLATE MATERIAL
3, 4: ADDITIONAL CORE PLATE MATERIAL
5: FRONT PLATE MATERIAL
6: REAR PLATE MATERIAL
10: VENEER
10A: FIRST CONSTITUENT PIECE
10b: SECOND CONSTITUENT PIECE
10c: THIRD CONSTITUENT PIECE
a: SHORT SIDE OF PLATE MATERIAL
b: LONG SIDE OF PLATE MATERIAL
c: ONE SIDE OF SQUARE VENEER

The invention claimed is:

1. A quake-resistant plywood laminate comprising:
a core plate material that is disposed at a center of a cubic plywood laminate and has lateral wood grains;
one additional core plate material that is stuck to one side of the core plate material and has 45° inclined wood grains;
the other additional core plate material that is stuck to the other side of the core plate material and has 45° inclined wood grains in an opposite direction with respect to that of the one additional core plate material; and,
exterior surface plates each of which is stuck to each of external surfaces of the one and the other additional core plate materials to be a front or a back and has vertical wood grains;
wherein each of the one and the other additional core plate material is configured of a rectangular plate material having 45° inclined wood grains, which is obtained in such a manner that a square plate material having vertical or lateral wood grains is divided into two equal parts along one diagonal to obtain a pair of first constituent pieces configured of isosceles right triangles respectively, one first constituent piece is further divided into two equal parts along a bisector of an apex angle thereof to obtain a pair of second constituent pieces configured of isosceles right triangles respectively, wherein one of the second constituent pieces has wood grains extending parallel to the base thereof, and the other of the second constituent pieces has wood grains extending perpendicular to the base thereof, wherein, along respective hypotenuses of the first constituent piece, respective bases of the second constituent pieces are integrally joined such that the wood grains of each of the second constituent pieces are matched with the wood grains of the first constituent piece along the respective hypotenuses of the first constituent piece, and wherein, when the additional core plate material is formed by sticking a plurality of plate materials of which wood grains are arranged, between plate materials to be stuck, joint lines between the first constituent piece and the second constituent pieces are disposed not to be superposed such that a base of the first constituent piece of the one additional core plate material and a base of the first constituent piece of the other additional core plate material are positioned opposite to each other.

2. The quake-resistant plywood laminate according to claim 1, wherein an entirety or a part of a core plate material, one additional core plate material, the other additional core plate material, and an external surface plate that is a front surface or a rear surface of a quake-resistant plywood laminate is formed by sticking a plurality of plates of which wood grains are arranged so as to have a predetermined strength.

* * * * *